United States Patent
Ishikawa et al.

(10) Patent No.: US 10,600,471 B1
(45) Date of Patent: Mar. 24, 2020

(54) SEMICONDUCTOR DEVICE PERFORMING ROW HAMMER REFRESH OPERATION

(71) Applicant: MICRON TECHNOLOGY, INC., Boise, ID (US)

(72) Inventors: Toru Ishikawa, Sagamihara (JP); Takuya Nakanishi, Hino (JP); Shinji Bessho, Hachioji (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/208,217

(22) Filed: Dec. 3, 2018

(51) Int. Cl.
  *G11C 7/00* (2006.01)
  *G11C 11/406* (2006.01)
  *G11C 11/4076* (2006.01)
  *G11C 11/408* (2006.01)

(52) U.S. Cl.
  CPC .... *G11C 11/40615* (2013.01); *G11C 11/4076* (2013.01); *G11C 11/4087* (2013.01)

(58) Field of Classification Search
  CPC .......... G11C 11/40615; G11C 11/4076; G11C 11/4087
  USPC .......................................................... 365/222
  See application file for complete search history.

(56) References Cited

U.S. PATENT DOCUMENTS

| | | | | |
|---|---|---|---|---|
| 6,002,629 | A * | 12/1999 | Kim ..................... | G11C 11/4087 365/222 |
| 6,392,952 | B1 * | 5/2002 | Chen ........................ | G11C 8/08 365/222 |
| 9,818,469 | B1 * | 11/2017 | Kim ....................... | G06F 3/0619 |
| 2017/0287547 | A1 * | 10/2017 | Ito ......................... | G11C 29/783 |

* cited by examiner

*Primary Examiner* — Tha-O H Bui
(74) *Attorney, Agent, or Firm* — Dorsey & Whitney LLP

(57) ABSTRACT

Disclosed herein is an apparatus that includes a memory cell array including a plurality of word lines each coupled to a plurality of memory cells, and a control circuit configured to activate first and second internal signals in a time-division manner in response to a first external command. A first number of the word lines are selected in response to the first internal signal, and a second number of the word line is selected in response to the second internal signal, the second number is smaller than the first number.

20 Claims, 18 Drawing Sheets

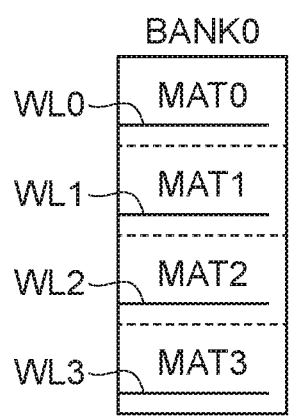
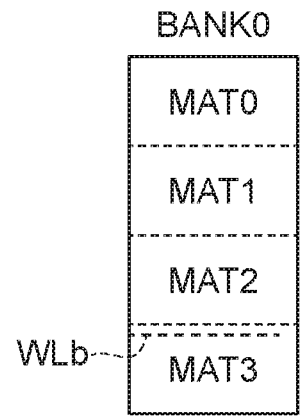
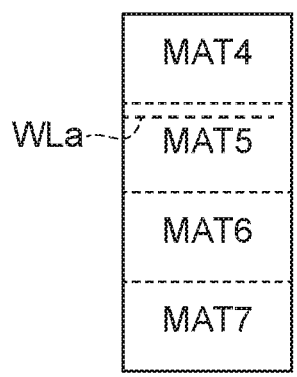
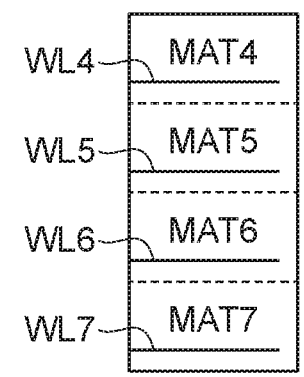
FIG. 10A            FIG. 10B

SEMICONDUCTOR DEVICE PERFORMING ROW HAMMER REFRESH OPERATION

BACKGROUND

If accesses are concentrated to the same word line in a semiconductor device such as a DRAM (Dynamic Random Access Memory), information storage characteristics of memory cells coupled to word lines adjacent to that word line may be decreased. To solve this problem, a refresh operation for the memory cells coupled to the adjacent word lines is sometimes performed in addition to the normal refresh operation to prevent loss of information of the relevant memory cells. This additional refresh operation is called "row hammer refresh".

Generally, the row hammer refresh operation is performed so as to interrupt the normal refresh operation. Accordingly, if the frequency of the row hammer refresh operations is increased, it leads to a problem that the number of the normal refresh operations is reduced and the refresh cycle becomes longer.

BRIEF DESCRIPTION OF THE DRAWINGS

FIG. 10A is a schematic diagram for explaining an operation of the semiconductor device according to the second embodiment of the present disclosure responsive to the first occurrence of the row active signal.

FIG. 10B is a schematic diagram for explaining an operation of the semiconductor device according to the second embodiment of the present disclosure responsive to the second occurrence of the row active signal.

DETAILED DESCRIPTION

Various embodiments of the present invention will be explained below in detail with reference to the accompanying drawings. The following detailed description refers to the accompanying drawings that show, by way of illustration, specific aspects and embodiments in which the present invention may be practiced. These embodiments are described in sufficient detail to enable those skilled in the art to practice the present invention. Other embodiments may be utilized, and structural, logical and electrical changes may be made without departing from the scope of the present invention. The various embodiments disclosed herein are not necessary mutually exclusive, as some disclosed embodiments can be combined with one or more other disclosed embodiments to form new embodiments.

Figure 1:
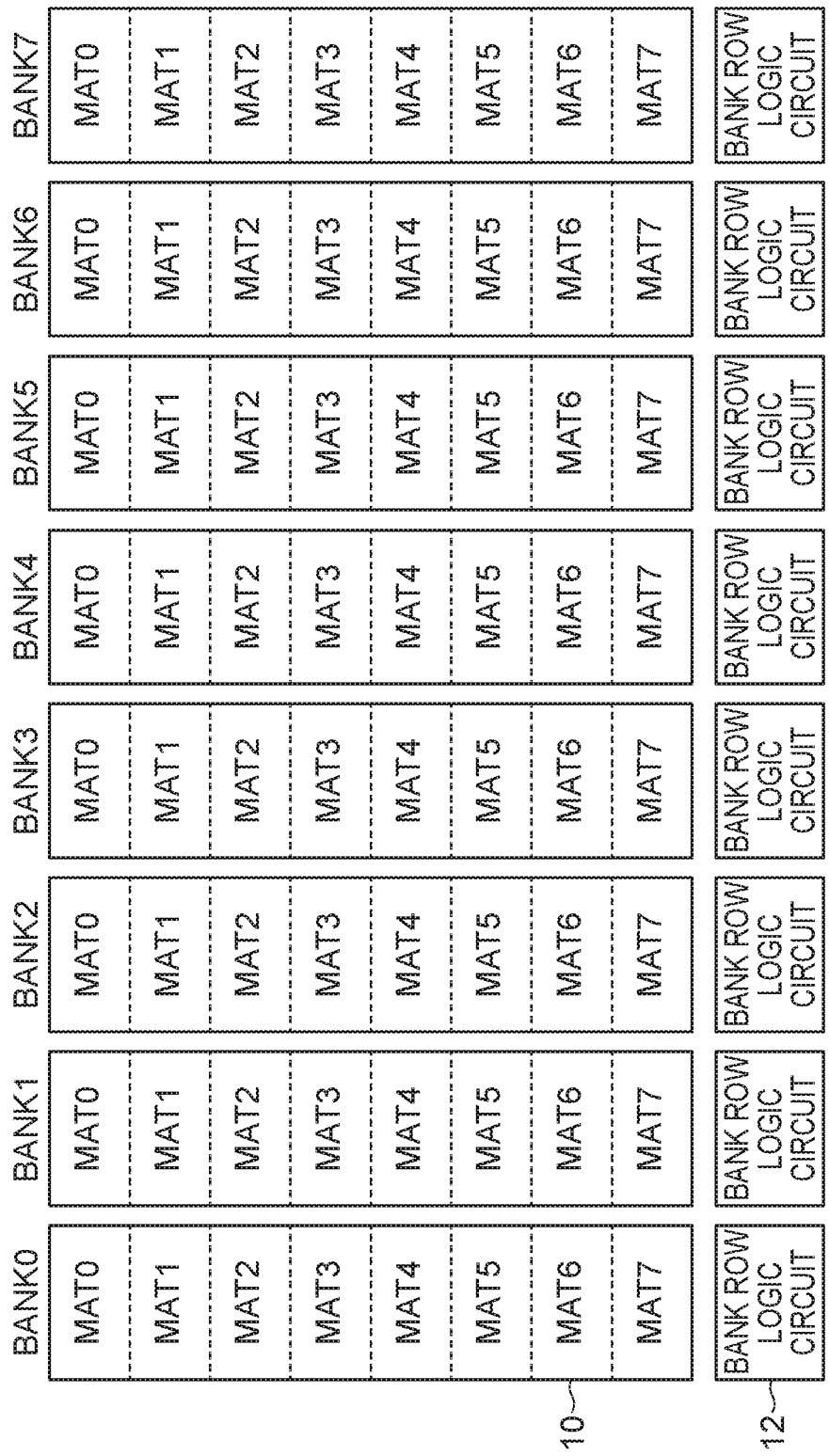
FIG. 1 is a block diagram of a semiconductor device according to a first embodiment of the present disclosure.

A semiconductor device 1 according to a first embodiment shown in FIG. 1 is a DRAM and includes eight memory banks BANK0 to BANK7, bank row logic circuits 12 respectively allocated to the memory banks BANK0 to BANK7, a control logic circuit 14 that controls the entire operation of the semiconductor device 1, and a plurality of external terminals 16. The memory banks BANK0 to BANK7 are arrayed in an x direction. Each of the memory banks BANK0 to BANK7 is divided into eight memory mats MAT0 to MAT7 arranged in a y direction. The external terminals 16 include external terminals to which clock signals CK and CKB, an external command COM, an external address signal ADD, and a data mask signal DM are respectively input, and an external terminal that performs input/output of read data/write data DQ.

Figure 2:
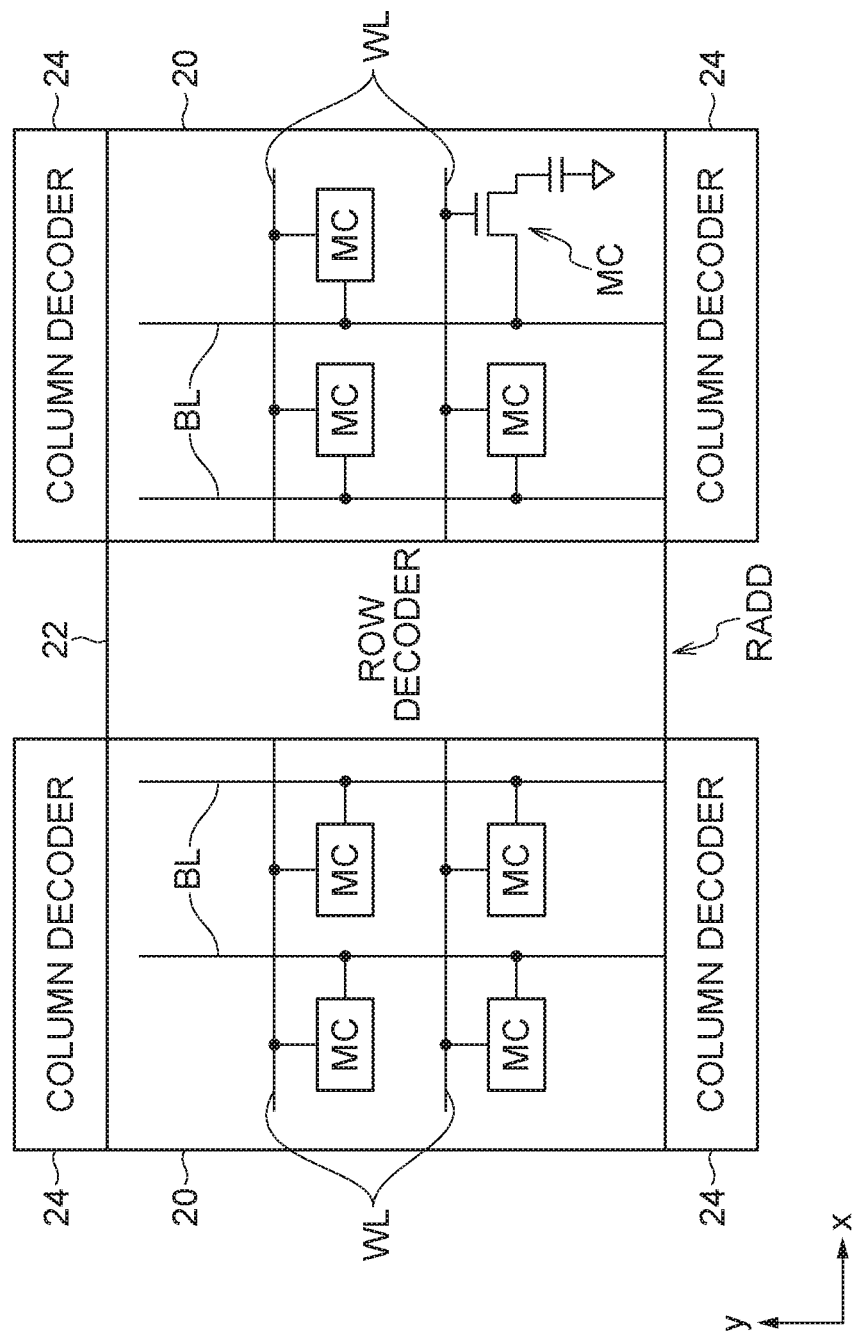
FIG. 2 is a diagram indicating a memory mat.

As shown in FIG. 2, each memory mat has a memory cell array 20 including a plurality of word lines WL extending in the x direction, a plurality of bit lines BL extending in the y direction, and a plurality of memory cells MC respectively placed at intersections between the word lines WL and the bit lines BL. In an example shown in FIG. 2, the memory cell array 20 is divided into two parts in the x direction and a row decoder 22 that selects a word line WL is placed between the two memory cell arrays 20. Column decoders 24 that respectively select bit lines BL are placed on both ends of the memory cell arrays 20 in the y direction. The memory cells MC are DRAM cells each including a cell transistor and a cell capacitor connected in series. Because the DRAM cells are volatile cells, data stored in the DRAM cells needs to be held by a periodic refresh operation. If accesses are concentrated to the same word line WL, information storage characteristics of memory cells MC coupled to word lines WL adjacent to that word line WL may be decreased. Accordingly, the row hammer refresh operation should be performed in addition to the normal refresh operation to prevent loss of information in the memory cells MC coupled to the word lines WL adjacent to the word line WL to which accesses are concentrated.

Figure 3:
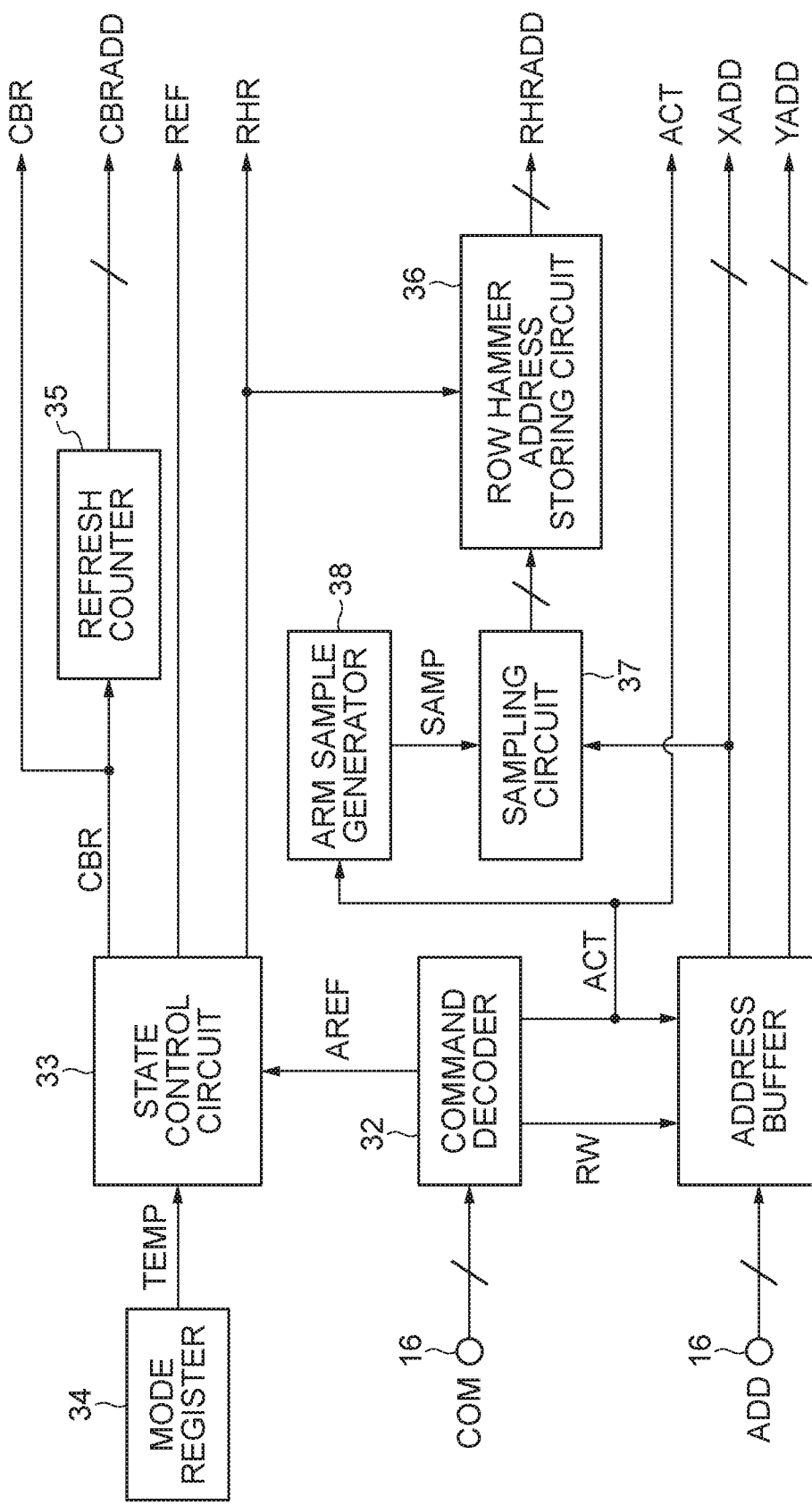
FIG. 3 is a block diagram indicating a part of the control logic circuit shown in FIG. 1.

FIG. 3 is a block diagram indicating a configuration of relevant parts of the control logic circuit 14 shown in FIG. 1. As shown in FIG. 3, the control logic circuit 14 has an address buffer 31 to which the external address signal ADD is input, and a command decoder 32 to which the external command signal COM is input. The command decoder 32 activates an active signal ACT when the external command signal COM indicates an active command, activates a read/write signal RW when the external command COM indicates a read command or a write command, and activates a refresh signal AREF when the external command signal COM indicates a refresh command. The address buffer 31 outputs the external address signal ADD as a row address XADD when the active signal ACT is activated, and outputs the external address signals ADD as a column address YADD when the read/write signal RW is activated. The row address XADD is used for selection of a word line WL using the row decoder 22 and the column address YADD is used for selection of a bit line BL using the column decoder 24. The external address signal ADD includes also a bank address that designates one of the memory banks BANK0 to BANK7.

The refresh signal AREF is supplied to a state control circuit 33. The state control circuit 33 activates internal signals REF, CBR, and RHR in a predetermined order when the refresh signal AREF is activated. The state control circuit 33 can be configured to receive a temperature signal TEMP set in a mode register 34 and switch the operation mode on the basis of the temperature signal TEMP. The internal signal CBR generated by the state control circuit 33 is a signal for performing a normal refresh operation. The internal signal CBR is supplied to a refresh counter 35. The refresh counter 35 holds an address CBRADD of a word line WL being a target of refresh operation. The value of the address CBRADD held in the refresh counter 35 is incremented or decremented each time the internal signal CBR is activated. In the present embodiment, upper three bits of the address CBRADD held in the refresh counter 35 are degenerated and therefore there are eight word lines WL corresponding to one address CBRADD. Meanwhile, the internal signal RHR is a signal for performing a row hammer refresh operation. The internal signal RHR is supplied to a row hammer address storing circuit 36. The row hammer address storing circuit 36 stores therein the address of a word line WL being a target of the row hammer refresh operation, or an address related thereto. For example, the address stored in the row hammer address storing circuit 36 may be the address itself of a word line WL to which accesses are concentrated, or may be the address of a word line WL adjacent to the word line WL to which accesses are concentrated. A plurality of addresses (four addresses, for example) are stored in the row hammer address storing circuit 36, and an output address RHRADD is switched each time the internal signal RHR is activated.

The address stored in the row hammer address storing circuit 36 is provided by a sampling circuit 37. The sampling circuit 37 samples the row address XADD at a timing when a sampling signal SAMP generated by an arm sample generator 38 is activated, and overwrites the sampled row address XADD in the row hammer address storing circuit 36. The arm sample generator 38 may activate the sampling signal SAMP at a timing when the active signal ACT has been activated a predetermined number of times. Accordingly, the address of the word line WL to which accesses are concentrated is stored in the row hammer address storing circuit 36.

Figure 4:
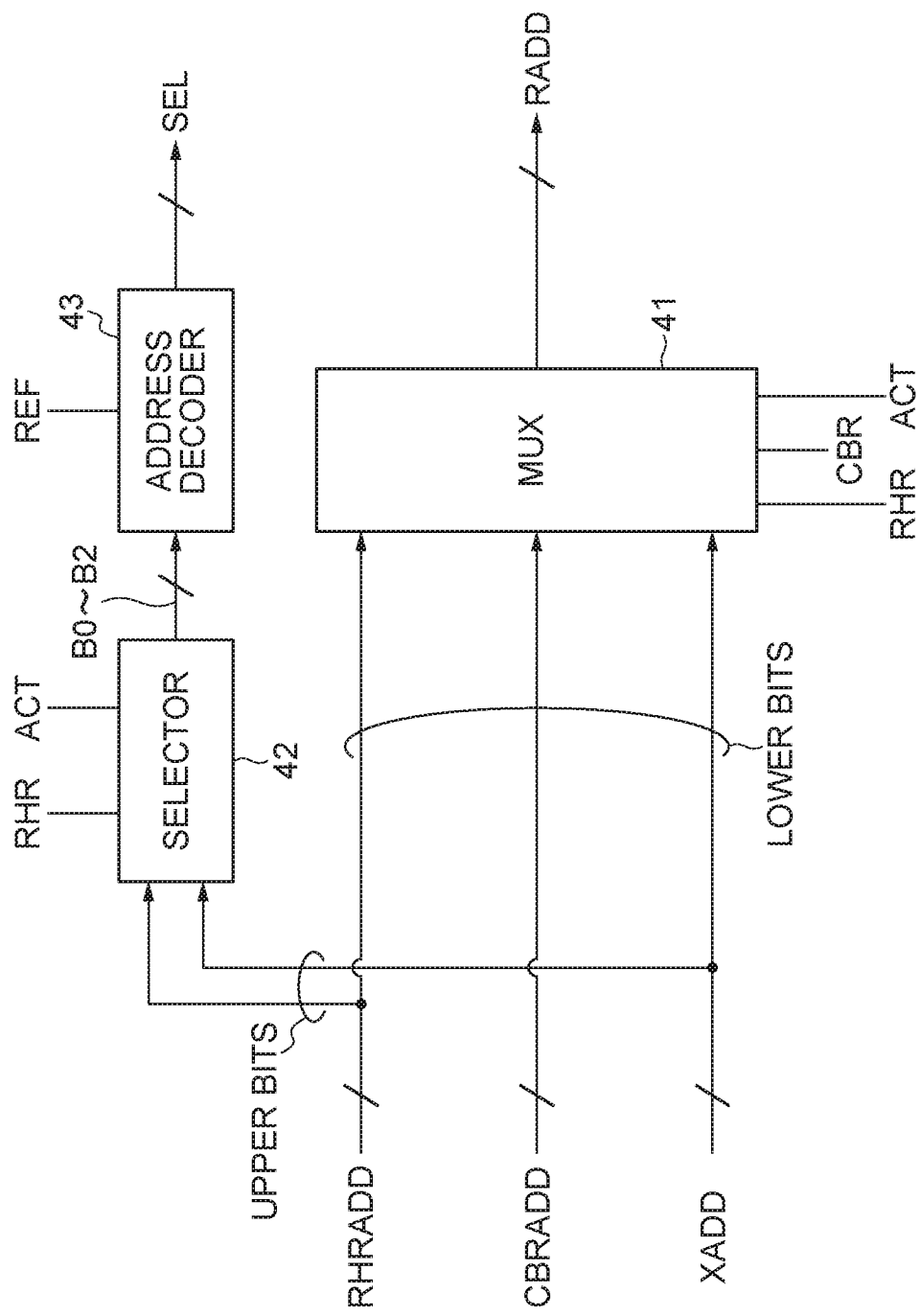
FIG. 4 is a block diagram indicating a part of the bank row logic circuit shown in FIG. 1.

The internal signals REF, CBR, and RHR, the active signal ACT, and the address signals XADD, CBRADD, and RHRADD generated by the control logic circuit 14 are supplied to the bank row logic circuit 12 allocated to a designated memory bank. As shown in FIG. 4, the bank row logic circuit 12 has a multiplexer 41, a selector 42, and an address decoder 43. The multiplexer 41 receives the respective lower bits of the address signals XADD and RHRADD and the address signal CBRADD and selects one of the respective lower bits of the address signals XADD and RHRADD and the address signal CBRADD as a row address RADD on the basis of the active signal ACT and the internal signals CBR and RHR. That is, the bank row logic circuit 12 selects the lower bits of the address signal XADD as the row address RADD when the active signal ACT is activated, selects the address signal CBRADD as the row address RADD when the internal signal CBR is activated, and selects the lower bits of the address signal RHRADD as the row address RADD when the internal signal RHR is activated. The row address RADD output from the multiplexer 41 is supplied to the row decoder 22 shown in FIG. 2. The row decoder 22 selects a word line WL indicated by the row address RADD.

Meanwhile, respective upper bits (three bits in the present embodiment) of the address signals XADD and RHRADD are supplied to the selector 42. The selector 42 supplies bit data B0 to B2 being the upper bits of either the address signal XADD or the address signal RHRADD to the address decoder 43 on the basis of the active signal ACT and the internal signal RHR. The address decoder 43 decodes the bit data B0 to B2 to generate a selection signal SEL used for mat selection.

Figure 5:
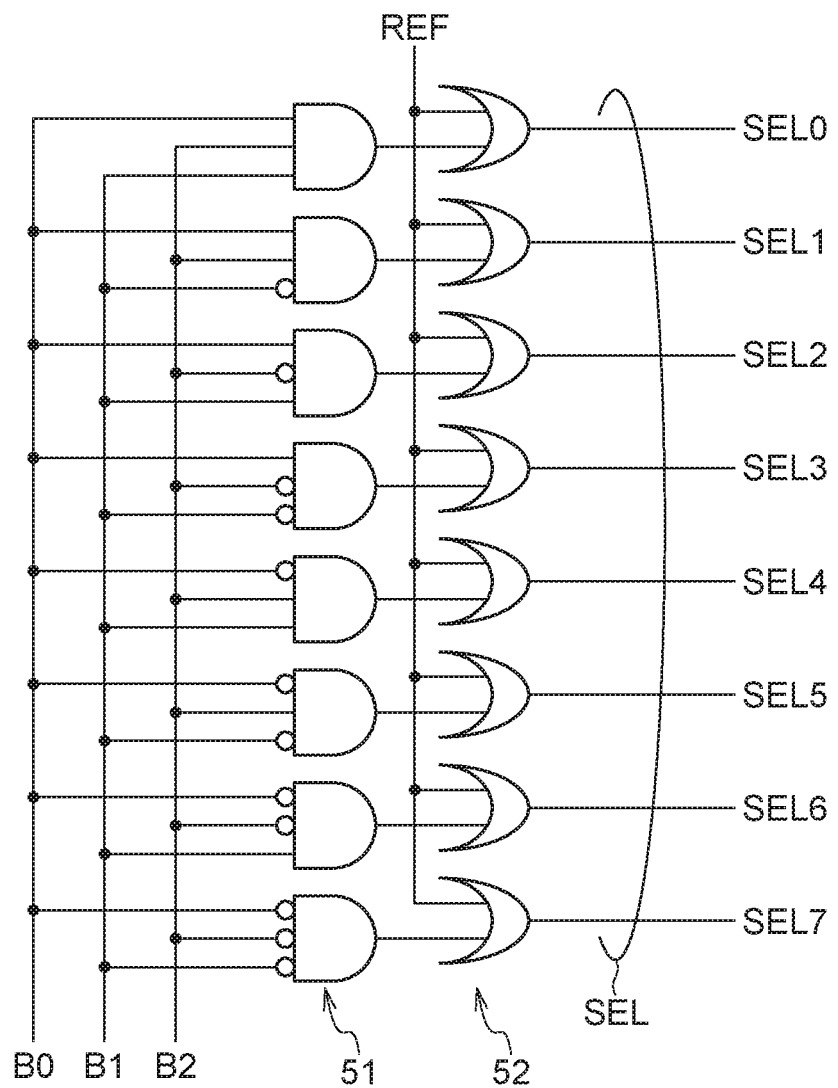
FIG. 5 is a circuit diagram indicating the address decoder shown in FIG. 5.

As shown in FIG. 5, the address decoder 43 has an AND gate circuit group 51 that decodes the bit signals B0 to B2 being the upper bits of the address signal XADD or RHRADD, and an OR gate circuit group 52 connected at the subsequent stage of the AND gate circuit group 51. Ones of input nodes of OR gate circuits constituting the OR gate circuit group 52 are respectively supplied with outputs of the corresponding AND gate circuits, and the internal signal REF is input in common to the other input nodes. The internal signal CBR can be used instead of the internal signal REF to be supplied to the OR gate circuit group 52. With this configuration, during a period in which the internal signal REF is not activated, that is, at a time of the normal row access or the row hammer refresh operation, one of selection signals SEL0 to SEL7 is activated on the basis of the bit signals B0 to B2. The selection signals SEL0 to SEL7 correspond to the memory mats MAT0 to MAT7, respectively. Accordingly, at a time of the normal row access or the row hammer refresh operation, one of the memory mats MAT0 to MAT7 is selected and the remaining seven memory mats are in a non-selected state. In contrast thereto, during a period in which the internal signal REF is activated, that is, at a time of the normal refresh operation, the bit signals B0 to B2 are invalidated and the selection signals SEL0 to SEL7 are all activated. Therefore, the eight memory mats MAT0 to MAT7 are all selected at a time of the normal refresh operation.

Figure 6:
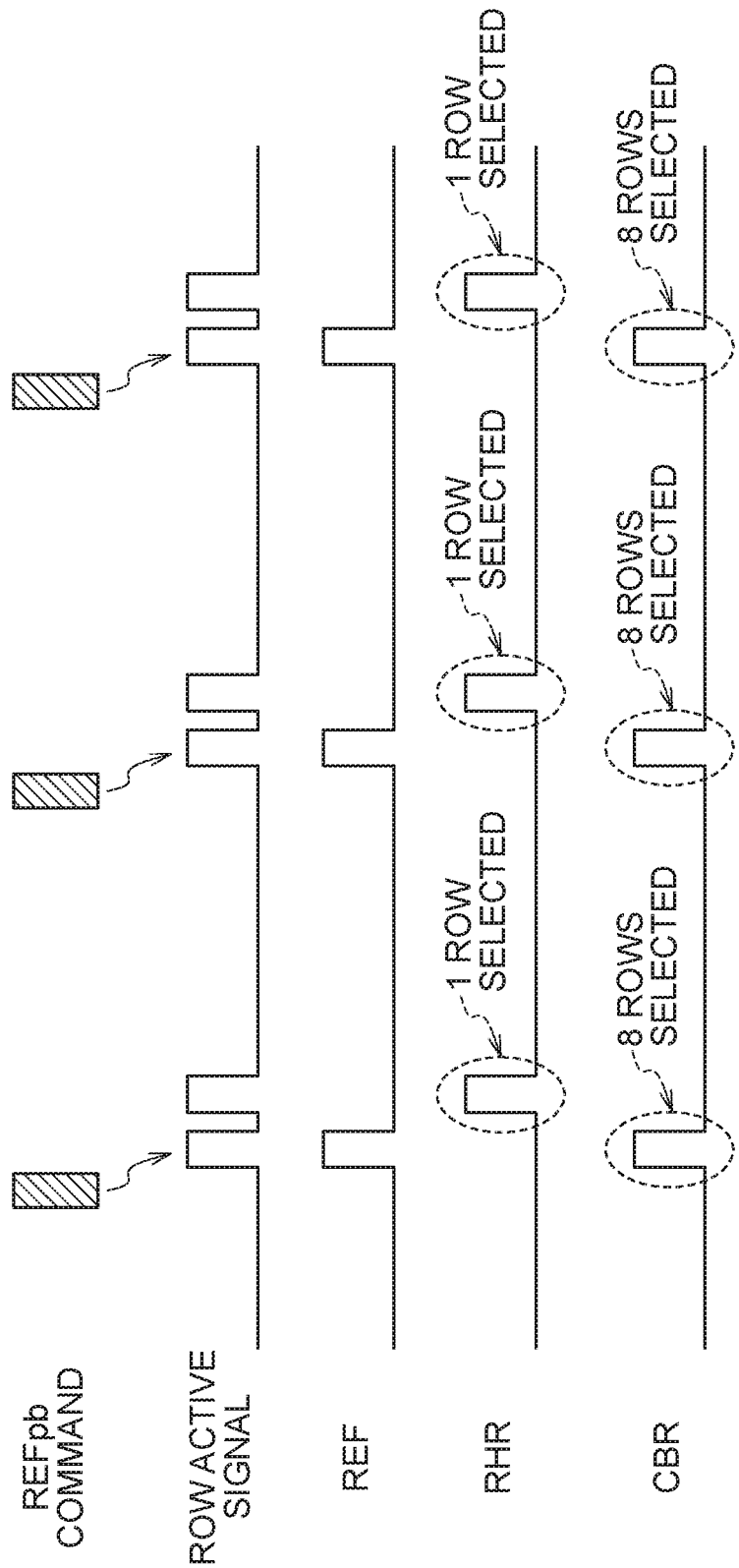
FIG. 6 is a timing chart for explaining an operation of the semiconductor device according to the first embodiment of the present disclosure.

FIG. 6 is a timing chart for explaining an operation of the semiconductor device 1 according to the present embodiment when a per-bank refresh command REFpb is issued thereto. In the present embodiment, when the per-bank refresh command REFpb is issued from outside, a row active signal is generated twice consecutively in the state control circuit 33 as shown in FIG. 6. The internal signals REF and CBR are activated synchronously with the first activation of the row active signal and the internal signal RHR is activated synchronously with the second activation of the row active signal. Accordingly, the normal refresh operation is performed in response to the first activation of the row active signal and the row hammer refresh operation is performed in response to the second activation of the row active signal. That is, the normal refresh operation and the row hammer refresh operation are performed sequentially in response to one per-bank refresh command REFpb.

Figure 7A:
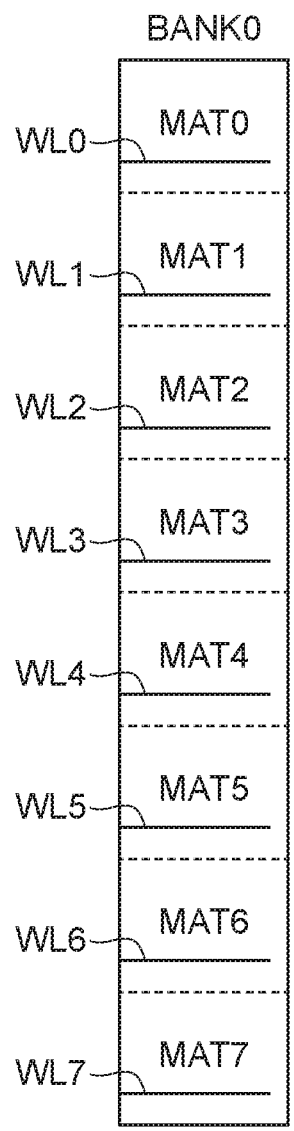
FIG. 7A is a schematic diagram for explaining an operation of the semiconductor device according to the first embodiment of the present disclosure responsive to the first occurrence of the row active signal.
Figure 7B:
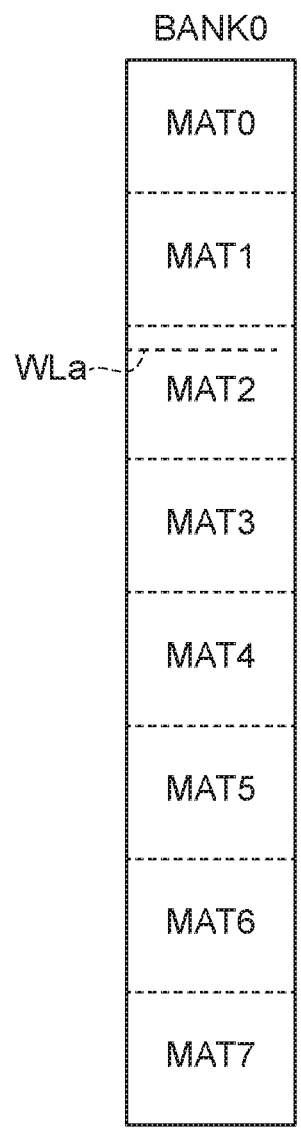
FIG. 7B is a schematic diagram for explaining an operation of the semiconductor device according to the first embodiment of the present disclosure responsive to the second occurrence of the row active signal.

As shown in FIG. 7A, for example, when the per-bank refresh command REFpb designates the memory bank BANK0, the memory mats MAT0 to MAT7 of the memory bank BANK0 are all selected in response to the first activation of the row active signal, and eight word lines WL0 to WL7 indicated by the address signal CBRADD input from the refresh counter 35 are selected simultaneously. These word lines WL0 to WL7 belong to the memory mats MAT0 to MAT7, respectively. As shown in FIG. 7B, one word line WLa which is indicated by the address signal RHRADD output from the row hammer address storing circuit 36 among the word lines WL included in the memory bank BANK0 is then selected in response to the second activation of the row active signal. A memory mat (MAT2 in an example shown in FIG. 7B) to which the word line WLa belongs is designated by the bit signals B0 to B2 being the upper bits of the address signal RHRADD. Selection of the word line WLa in the relevant memory mat MAT2 is performed on the basis of the lower bits of the address signal RHRADD.

In the present embodiment, both the normal refresh operation and the row hammer refresh operation are thus performed sequentially in response to one per-bank refresh command REFpb and therefore the number of the normal refresh operations does not decrease. Accordingly, the refresh cycle is not elongated due to the row hammer refresh operation. Furthermore, because the row hammer refresh operation is performed each time the per-bank refresh command REFpb is issued, the execution frequency of the row hammer refresh operations is also increased. At the time of the row hammer refresh operation, only one word line WL is selected. Accordingly, increase in current consumption and noise occurring due to execution of the row hammer refresh operation can be minimized. In the example described above, the normal refresh operation and the row hammer refresh operation are performed in this order in response to the per-bank refresh command REFpb. However, the present invention is not limited thereto. Therefore, the row hammer refresh operation and the normal refresh operation can be performed in this order in response to the per-bank refresh command REFpb. The length of a word-line selection time (a sensing time in a sense amplifier) at a time when the internal signal CBR is activated can be longer than the length of a word-line selection time at a time when the internal signal RHR is activated considering that eight word lines are selected at the time of an activation of the internal signal CBR in the example described above and one word line is selected at the time of an activation of the internal signal RHR. This is because, when the internal signal CBR is activated, eight word lines are selected and it is therefore supposed that load is larger than that at a time of selection of one word line and that relatively long time is required. This control can be realized by delaying a timing of a control signal for deactivating the word lines in response to the internal signal CBR, for example, using a delay circuit.

Figure 8:
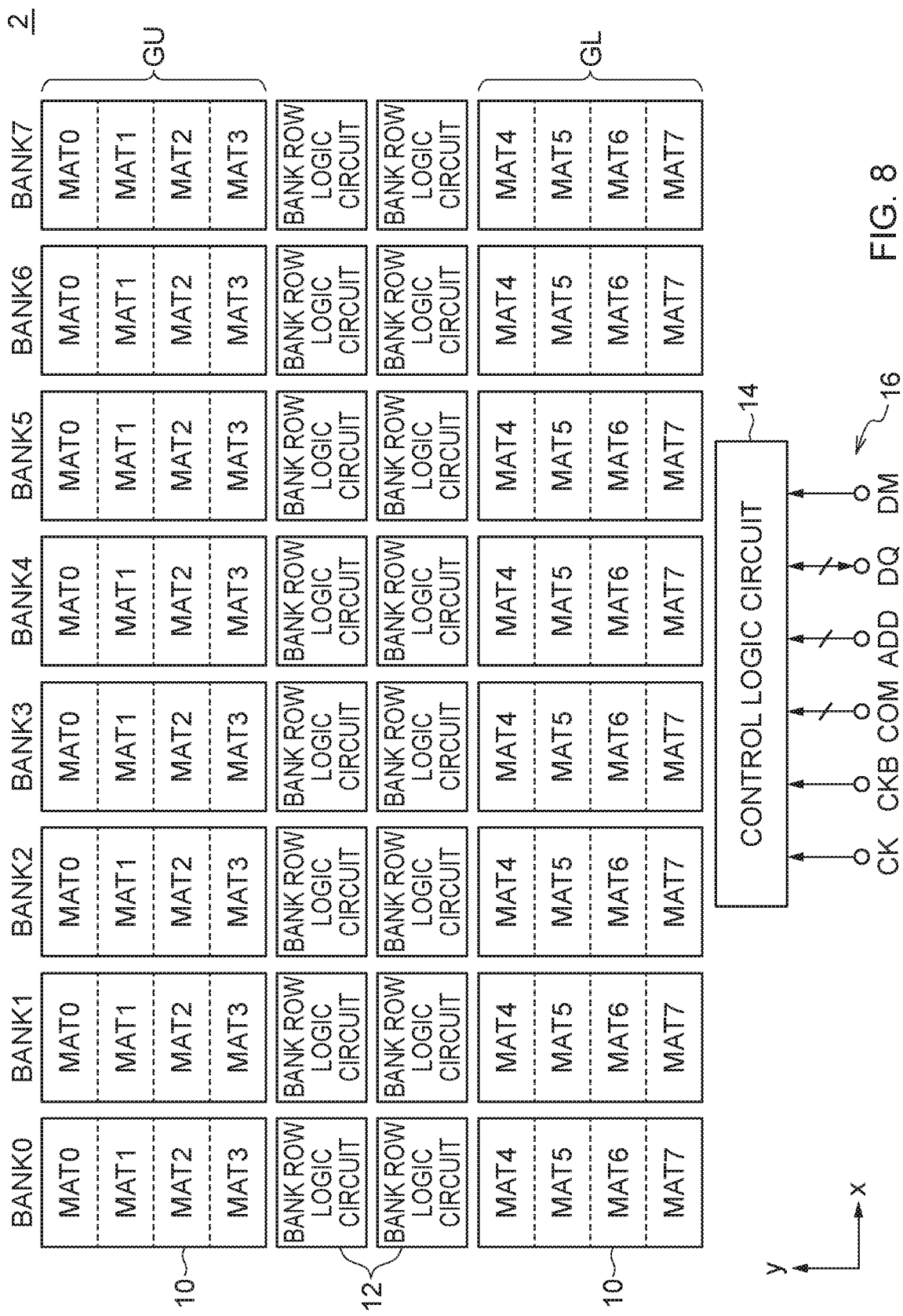
FIG. 8 is a block diagram of a semiconductor device according to a second embodiment of the present disclosure.

In a semiconductor device 2 according to a second embodiment shown in FIG. 8, the memory mats MAT0 to MAT7 included in each of the memory banks BANK0 to BANK7 are divided into two groups GU and GL and the bank row logic circuit 12 is provided for each of the groups GU and GL. The rest of the fundamental configuration is the same as that of the semiconductor device 1 according to the first embodiment shown in FIG. 1.

Figure 9:
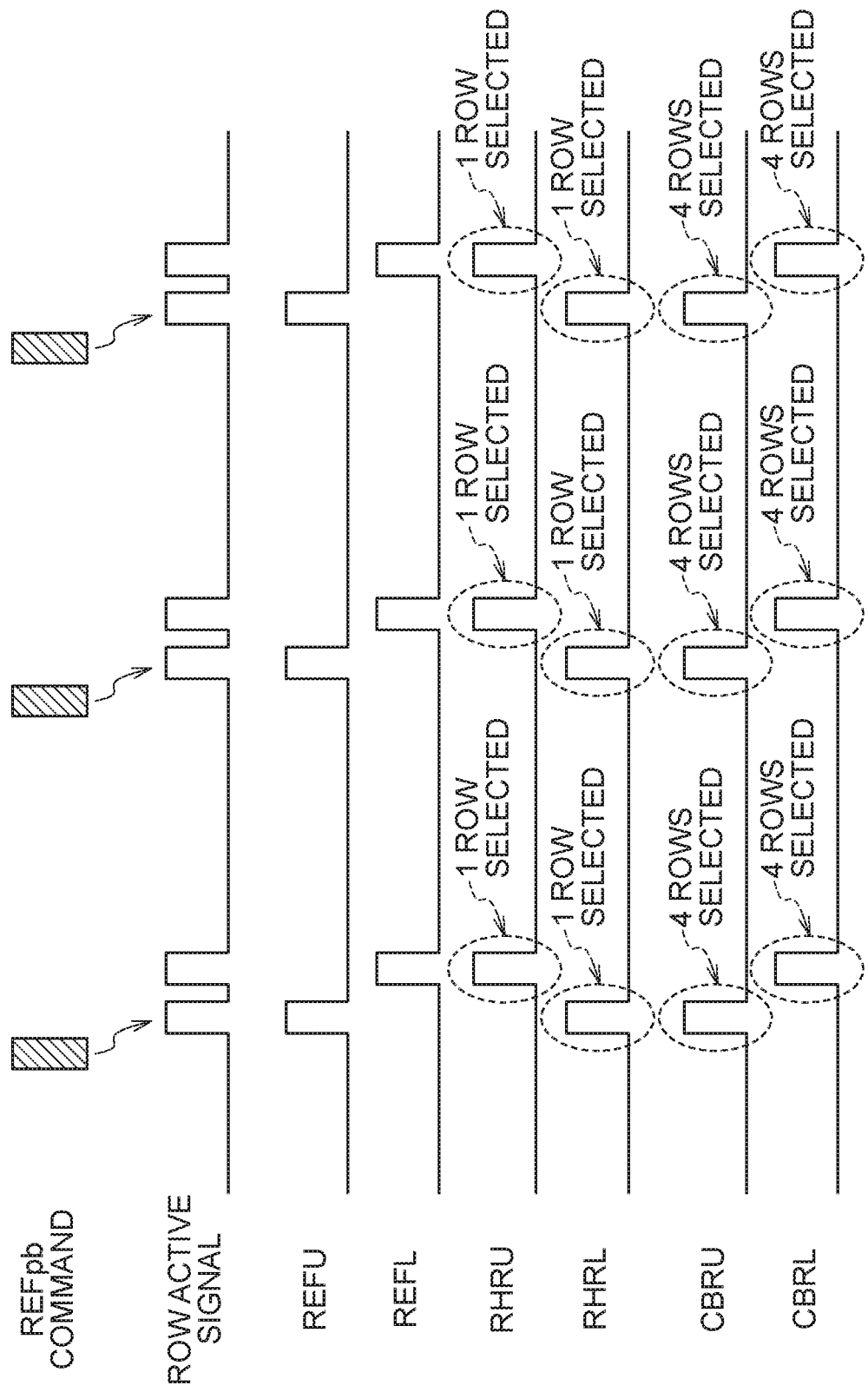
FIG. 9 is a timing chart for explaining an operation of the semiconductor device according to the second embodiment of the present disclosure.

FIG. 9 is a timing chart for explaining an operation of the semiconductor device 2 according to the present embodiment when the per-bank refresh command REFpb is issued thereto. In the present embodiment, the internal signals REF, CBR, and RHR are allocated to each of the groups GU and GL as shown in FIG. 9. That is, internal signals REFU, CBRU, and RHRU are allocated to the group GU and internal signals REFL, CBRL, and RHRL are allocated to the group GL.

When the per-bank refresh command REFpb is issued, the row active signal is generated twice consecutively in the state control circuit 33. The internal signals REFU, CBRU, and RHRL are activated synchronously with the first activation of the row active signal, and the internal signals REFL, CBRL, and RHRU are activated synchronously with the second activation of the row active signal. Accordingly, the normal refresh operation is performed to the group GU and the row hammer refresh operation is performed to the group GL in response to the first activation of the row active signal. In response to the second activation of the row active signal, the normal refresh operation is performed to the group GL and the row hammer refresh operation is performed to the group GU.

For example, when the per-bank refresh command REFpb designates the memory bank BANK0, the mats MAT0 to MAT3 of the memory bank BANK0 are all selected in response to the first activation of the row active signal, and the word lines WL0 to WL3 indicated by the address signal CBRADD output from the refresh counter 35 are simultaneously selected and a word line WLa which is indicated by the address signal RHRADD output from the row hammer address storing circuit 36 is selected from among the word lines WL included in the mats MAT4 to MAT7 as shown in FIG. 10A. A memory mat (MAT5 in an example shown in FIG. 10A) to which the word line WLa belongs is designated by the bit signals B0 to B2 being the upper bits of the address signal RHRADD. As shown in FIG. 10B, the mats MAT4 to MAT7 of the memory bank BANK0 are all selected in response to the second activation of the row active signal, and the word lines WL4 to WL7 indicated by the address signal CBRADD output from the refresh counter 35 are simultaneously selected and a word line WLb indicated by the address signal RHRADD output from the row hammer address storing circuit 36 is selected from among the word lines WL included in the mats MAT0 to MAT3. A memory mat (MAT3 in an example shown in FIG. 10B) to which the word line WLb belongs is designated by the bit signals B0 to B2 being the upper bits of the address signal RHRADD.

As described above, in the present embodiment, the normal refresh operation of selecting four word lines WL and the row hammer refresh operation of selecting one word line WL are simultaneously performed and the above operations are performed twice consecutively. Therefore, the number of word lines WL selected by one operation is reduced, which can suppress the peak current. Furthermore, because the row hammer refresh operation is performed twice in response to one per-bank refresh command REFpb, the execution frequency of the row hammer refresh operations is doubled as compared to that in the semiconductor device 1 according to the first embodiment.

Figure 11:
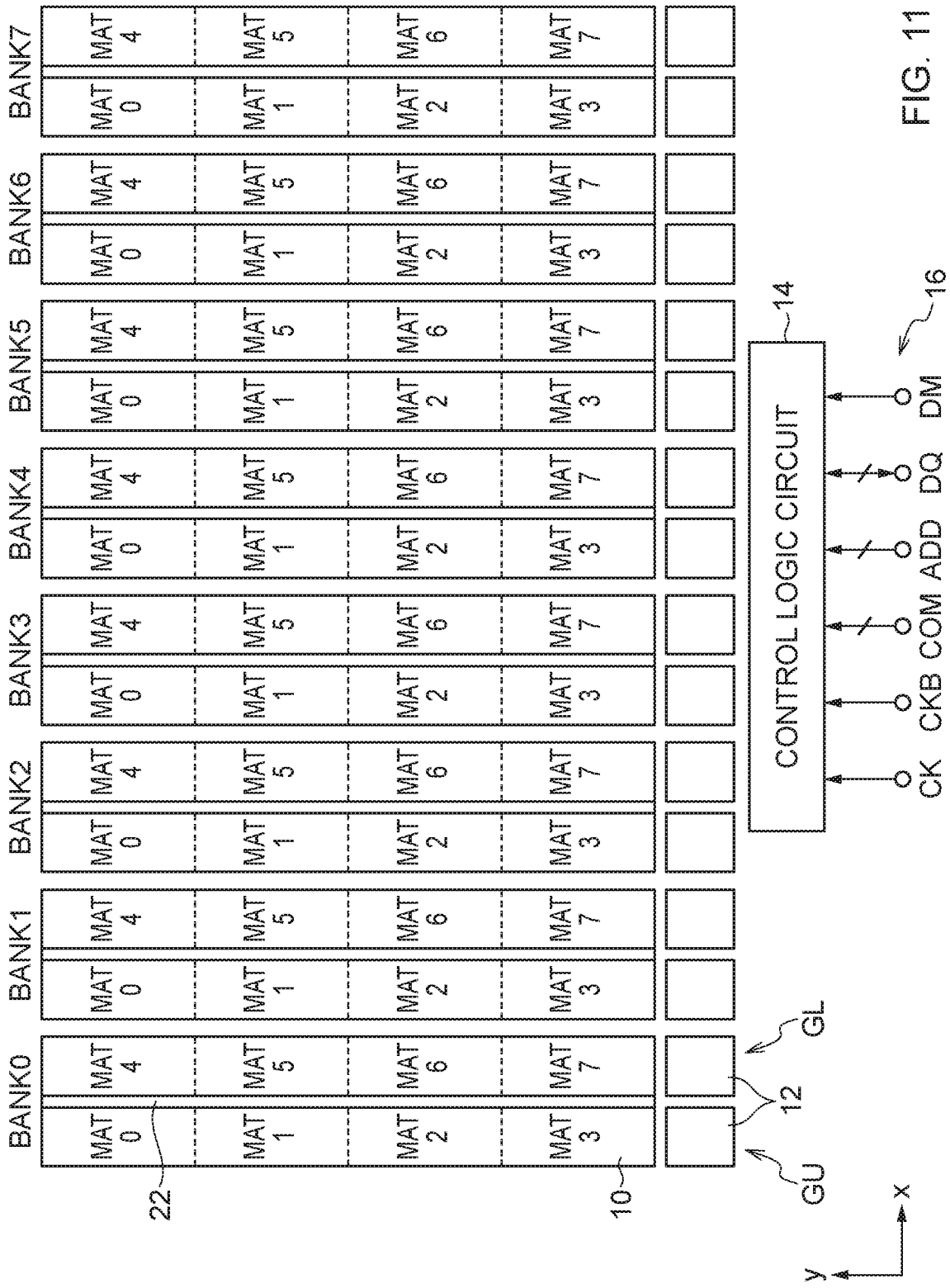
FIG. 11 is a block diagram of a semiconductor device according to a third embodiment of the present disclosure.

In a semiconductor device 3 according to a third embodiment shown in FIG. 11, the memory mats MAT0 to MAT7 included in each of the memory banks BANK0 to BANK7 are divided into two groups GU and GL and the bank row logic circuit 12 is provided for each of the groups GU and GL similarly in the semiconductor device 2 according to the second embodiment shown in FIG. 8. The semiconductor device 3 according to the third embodiment is different from the semiconductor device 2 according to the second embodiment shown in FIG. 8 in that the group GU and the group GL are arrayed in the x direction and the row decoder 22 is placed therebetween. The rest of the fundamental configuration is the same as that of the semiconductor device 2 according to the second embodiment shown in FIG. 8.

In the present embodiment, the operation performed when the per-bank refresh command REFpb is issued is the same as the operation explained with reference to FIG. 9. That is, the normal refresh operation is performed to the group GU and the row hammer refresh operation is performed to the group GL in response to the first activation of the row active signal, and the normal refresh operation is performed to the group GL and the row hammer refresh operation is performed to the group GU in response to the second activation of the row active signal.

Figure 12A:
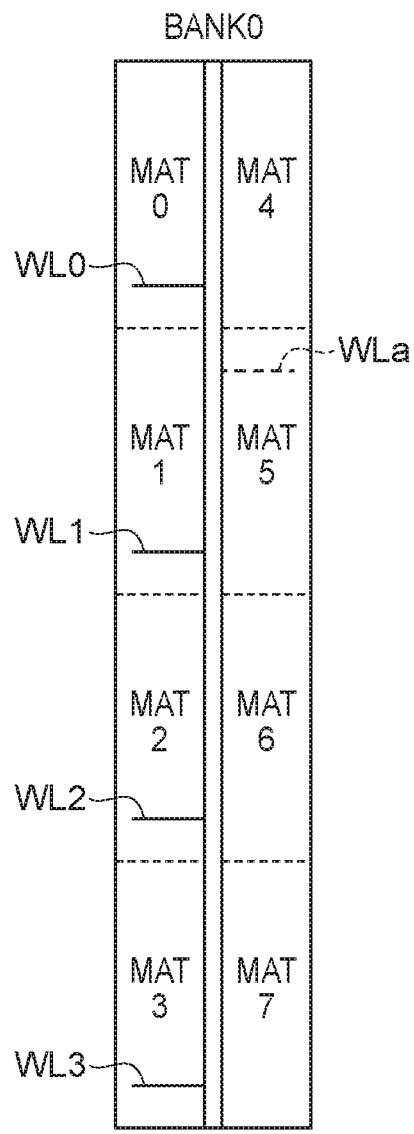
FIG. 12A is a schematic diagram for explaining an operation of the semiconductor device according to the third embodiment of the present disclosure responsive to the first occurrence of the row active signal.
Figure 12B:
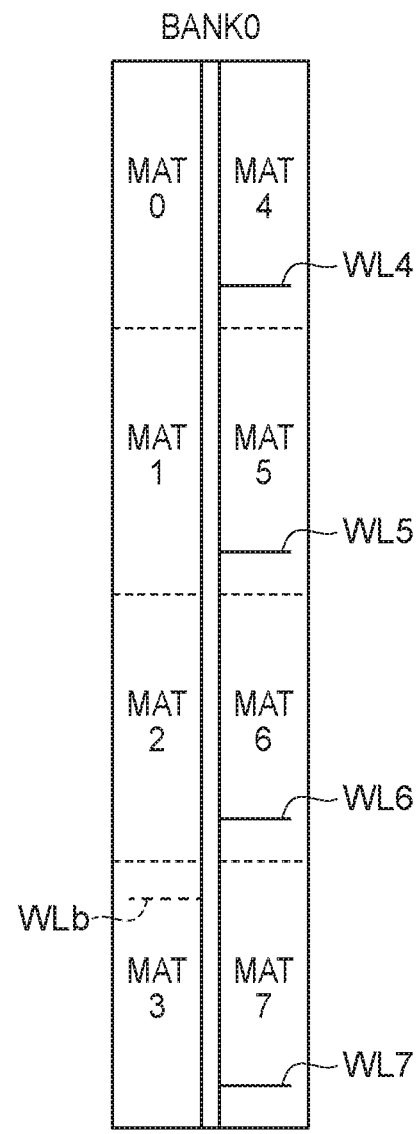
FIG. 12B is a schematic diagram for explaining an operation of the semiconductor device according to the third embodiment of the present disclosure responsive to the second occurrence of the row active signal.

For example, when the per-bank refresh command REFpb designates the memory bank BANK0, the mats MAT0 to MAT3 of the memory bank BANK0 are all selected in response to the first activation of the row active signal, and the word lines WL0 to WL3 indicated by the address signal CBRADD output from the refresh counter 35 are simultaneously selected and a word line WLa indicated by the address signal RHRADD output from the row hammer address storing circuit 36 is selected from among the word lines WL included in the mats MAT4 to MAT7 as shown in FIG. 12A. A memory mat (MAT5 in an example shown in FIG. 12A) to which the word line WLa belongs is designated by the bit signals B0 to B2 being the upper bits of the address signal RHRADD. The mats MAT4 to MAT7 of the memory bank BANK0 are then all selected in response to the second activation of the row active signal, and the word lines WL4 to WL7 indicated by the address signal CBRADD output from the refresh counter 35 are simultaneously selected and a word line WLb indicated by the address signal RHRADD output from the row hammer address storing circuit 36 is selected from among the word lines WL included in the mats MAT0 to MAT3 as shown in FIG. 12B. A memory mat (MAT3 in an example shown in FIG. 12B) to which the word line WLb belongs is designated by the bit signals B0 to B2 being the upper bits of the address signal RHRADD.

Figure 13A:
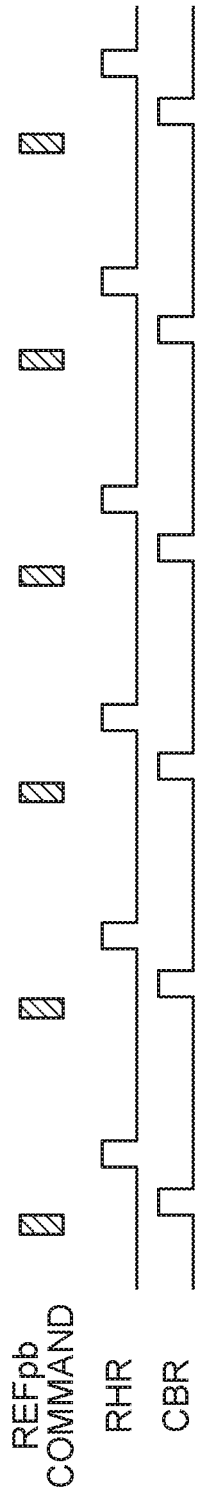
FIG. 13A is a timing chart for explaining an operation of the semiconductor device according to the first embodiment of the present disclosure in a case where the temperature is middle.
Figure 13B:
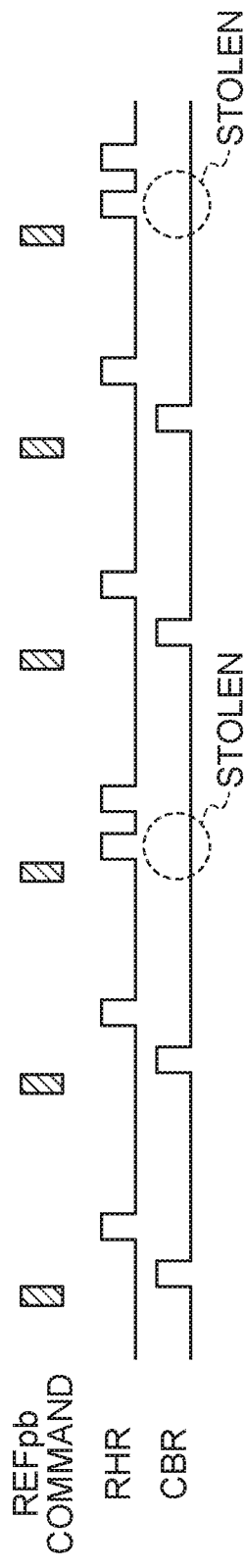
FIG. 13B is a timing chart for explaining an operation of the semiconductor device according to the first embodiment of the present disclosure in a case where the temperature is low.
Figure 13C:
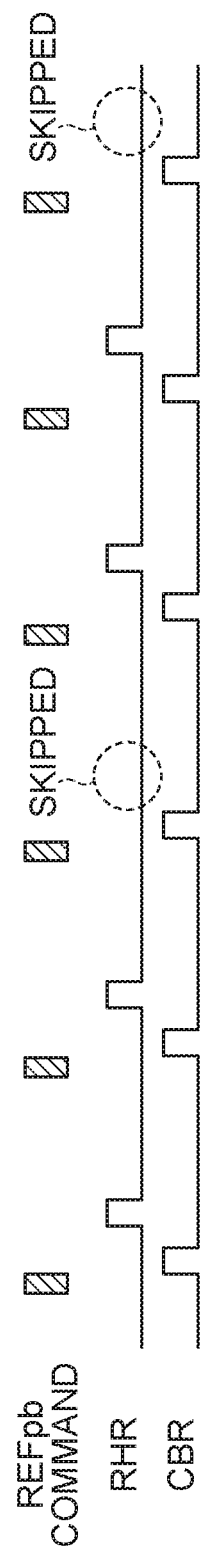
FIG. 13C is a timing chart for explaining an operation of the semiconductor device according to the first embodiment of the present disclosure in a case where the temperature is high.

The operation mode of the refresh operation in response to the per-bank refresh command REFpb can be changed by the temperature signal TEMP shown in FIG. 3. For example, when the temperature signal TEMP indicates a normal temperature state, the internal signals CBR and RHR are successively activated each time the per-bank refresh command REFpb is issued as shown in FIG. 13A, whereby the normal refresh operation and the row hammer refresh operation are sequentially performed. When the temperature signal TEMP indicates a low temperature state, the internal signals CBR and RHR are successively activated in principle each time the per-bank refresh command REFpb is issued while the internal signal RHR is activated twice consecutively without activating the internal signal CBR once every predetermined number of the per-bank refresh commands REFpb as shown in FIG. 13B (once every three per-bank refresh commands REFpb in an example shown in FIG. 13B). This increases the frequency of the row hammer refresh operations and therefore a sufficient number of the row hammer refresh operations per unit time is ensured even if the issuance period of the per-bank refresh command REFpb becomes longer due to the low temperature state. On the other hand, when the temperature signal TEMP indicates a high temperature state, the internal signals CBR and RHR are successively activated in principle each time the per-bank refresh command REFpb is issued while the internal signal CBR is activated only once without activating the internal signal RHR once every predetermined number of the per-bank refresh commands REFpb as shown in FIG. 13C (once every three per-bank refresh commands REFpb in an example shown in FIG. 13C). Because the row hammer refresh operation is thus skipped periodically, increase in the current consumption caused by execution of the row hammer refresh operation more than necessary can be suppressed even if the issuance period of the per-bank refresh command REFpb becomes shorter due to the high temperature state.

Figure 14A:
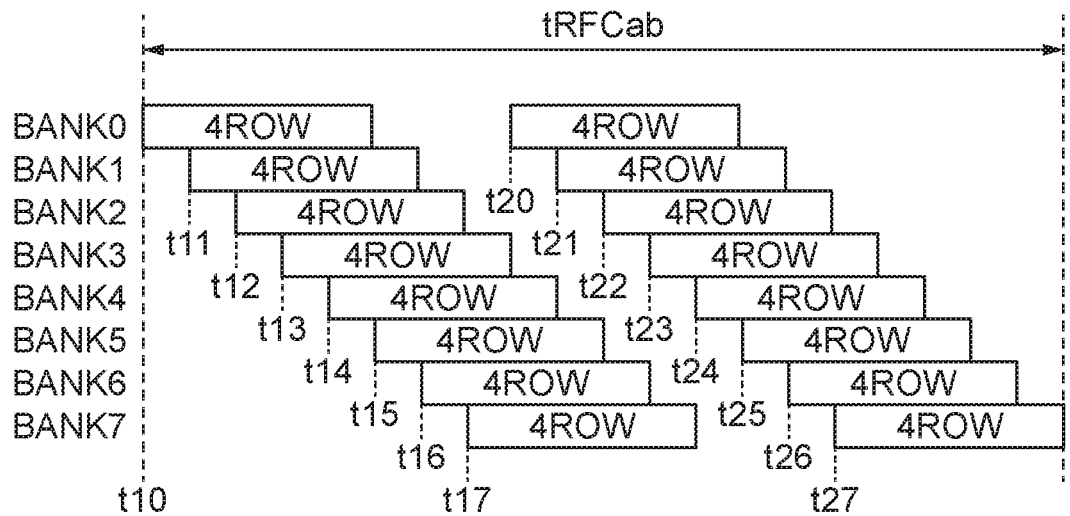
FIGS. 14A and 14B are timing charts for explaining an operation when an all-bank refresh command is issued.
Figure 14B:
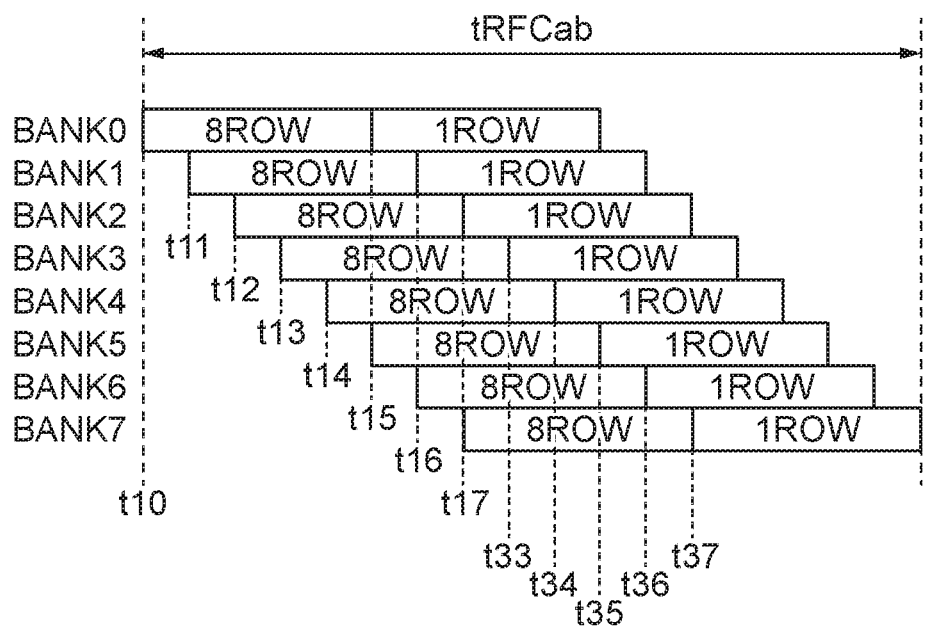

FIGS. 14A and 14B are timing charts for explaining an operation when an all-bank refresh command REFab is issued from outside. In an example shown in FIG. 14A, when the all-bank refresh command REFab is issued, the normal refresh operation is performed to four word lines WL included in each of the memory banks BANK0 to BANK7 (word lines WL respectively included in the memory mats MAT0 to MAT3, for example) at times t10 to t17, and the normal refresh operation is performed to different four word lines WL included in each of the memory banks BANK0 to BANK7 (word lines WL respectively included in the memory mats MAT4 to MAT7, for example) at times t20 to t27, respectively. Accordingly, a total of eight word lines WL is refreshed in each of all the memory banks BANK0 to BANK7. In contrast thereto, in an example shown in FIG. 14B, when the all-bank refresh command REFab is issued, the normal refresh operation is performed to eight word lines WL included in each of the memory banks BANK0 to BANK7 (word lines WL respectively included in the memory mats MAT0 to MAT7, for example) at the times t10 to t17, and the row hammer refresh operation is performed to one word line WL included in each of the memory banks BANK0 to BANK7 at the times t15 to t17 and times t33 to t37, respectively. Accordingly, in response to one all-bank refresh command REFab, the row hammer refresh operation for all the memory banks BANK0 to BANK7 can be performed. Besides, the normal refresh operation for the memory bank BANK5 and the row hammer refresh operation for the memory bank BANK0 are simultaneously started, the normal refresh operation for the memory bank BANK6 and the row hammer refresh operation for the memory bank BANK1 are simultaneously started, and the normal refresh operation for the memory bank BANK7 and the row hammer refresh operation for the memory bank BANK2 are simultaneously started. Therefore, a time tRFCab required for a series of operations can be shortened. Furthermore, the maximum number of word lines simultaneously refreshed is suppressed to nine, which minimizes occurrence of noise of a power supply and the like.

Figure 15:
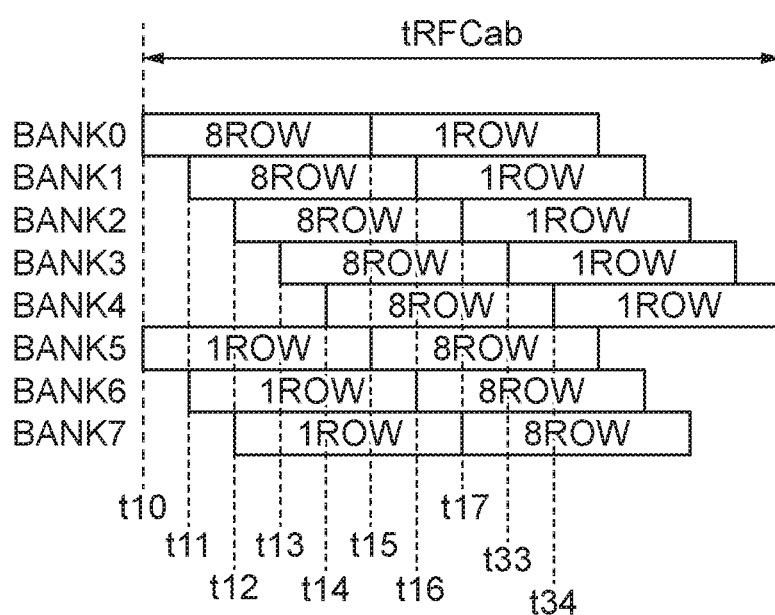
FIG. 15 is a timing chart for explaining another operation when an all-bank refresh command is issued.

FIG. 15 is a timing chart for explaining an operation according to a modification when the all-bank refresh command REFab is issued from outside. In an example shown in FIG. 15, when the all-bank refresh command REFab is issued, the normal refresh operation is performed to eight word lines WL included in each of the memory banks BANK0 to BANK7 at the times t10 to t17 and the row hammer refresh operation is performed to one word line WL included in each of the memory banks BANK0 to BANK7 at the times t10 to t12, t15 to t17, t33, and t34, respectively. Accordingly, similarly to the example shown in FIG. 14B, the row hammer refresh operations for all the memory banks BANK0 to BANK7 can be performed in response to one all-bank refresh command REFab. Besides, the time tRFCab required for a series of operations can be further shortened as compared to the case shown in FIG. 14B because the normal refresh operations for the memory banks BANK0 to BANK2 and BANK5 to BANK7 and the row hammer refresh operations for the memory banks BANK5 to BANK7 and BANK0 to BANK2 are simultaneously started, respectively.

Figure 16:
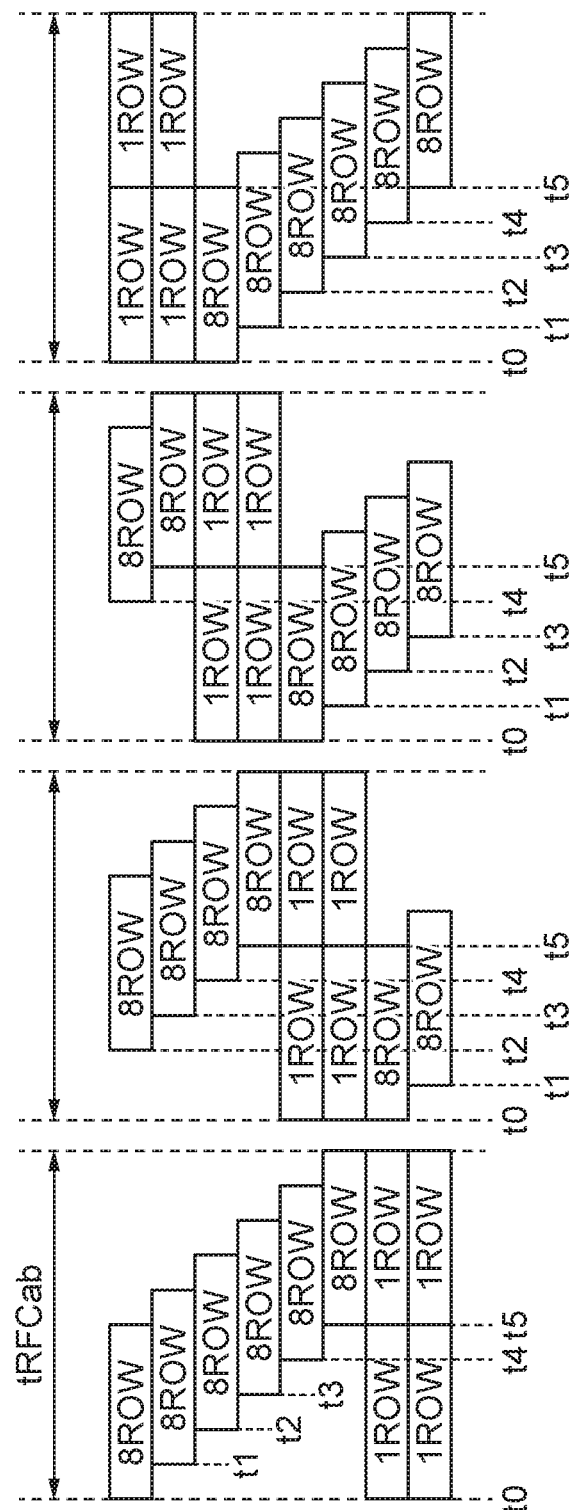
FIGS. 16A to 16D are timing charts for explaining still another operation when an all-bank refresh command is issued.

FIGS. 16A to 16D are timing charts for explaining an operation according to another modification when the all-bank refresh command REFab is issued from outside. First, when the first all-bank refresh command REFab is issued, the normal refresh operations for the memory banks BANK0 to BANK5 are sequentially performed and the row hammer refresh operation is performed to the memory banks BANK6 and BANK7 twice, respectively, as shown in FIG. 16A. Next, when the second all-bank refresh command REFab is issued, the normal refresh operations for the memory banks BANK6, BANK7, and BANK0 to BANK3 are sequentially performed and the row hammer refresh operation is performed to the memory banks BANK4 and BANK5 twice, respectively, as shown in FIG. 16B. When the third all-bank refresh command REFab is issued, the normal refresh operations for the memory banks BANK4 to BANK7, BANK0, and BANK1 are sequentially performed and the row hammer refresh operation is performed to the memory banks BANK2 and BANK3 twice, respectively, as shown in FIG. 16C. When the fourth all-bank refresh command REFab is issued, the normal refresh operations for the memory banks BANK3 to BANK7 are sequentially performed and the row hammer refresh operation is performed to the memory banks BANK0 and BANK twice, respectively, as shown in FIG. 16D. Accordingly, when the all-bank refresh command REFab is issued four times in total, the normal refresh operation is performed three times to each of all the memory banks BANK0 to BANK7 and the row hammer refresh operation is performed twice to each of all the memory banks BANK0 to BANK7. This can shorten the time tRFCab required for a series of the operations more than in the example shown in FIG. 15.

Figure 17:
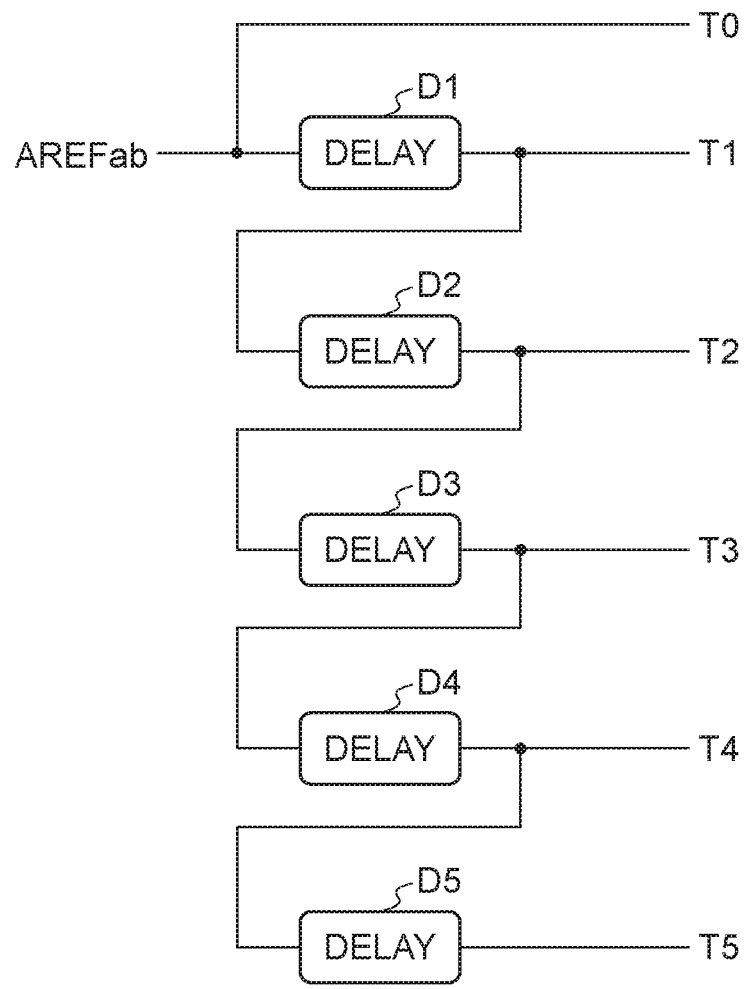
FIG. 17 is a diagram of a circuit for generating timing signals.
Figure 18:
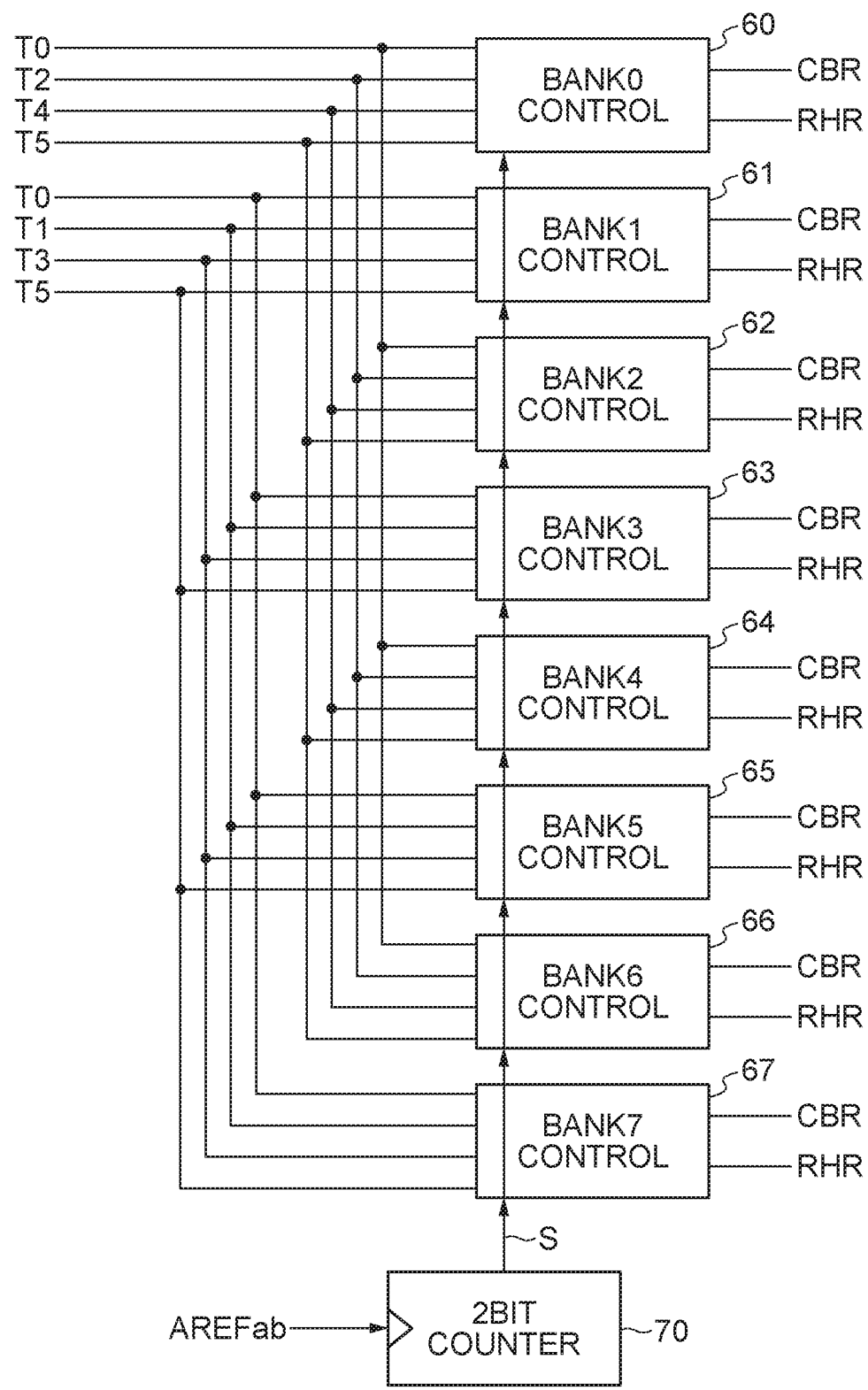
FIG. 18 is a block diagram of bank control circuits.

The operations shown in FIGS. 16A to 16D can be easily realized using a circuit shown in FIGS. 17 and 18. FIG. 17 shows a circuit for generating timing signals T0 to T5. In an example shown in FIG. 17, a plurality of delay circuits D1 to D5 are cascade connected and a refresh signal AREFab is input to the first delay circuit D1. The refresh signal AREFab is an internal signal activated each time the all-bank refresh command REFab is issued. With this configuration, when the all-bank refresh command REFab is issued, the delay circuits D1 to D5 are sequentially activated. The timing signals T0 to T5 are supplied to bank control circuits 60 to 67 shown in FIG. 18. Among these bank control circuits, the bank control circuits 60, 62, 64, and 66 corresponding to the memory banks BANK0, BANK2, BANK4, and BANK6 are supplied with the timing signals T0, T2, T4, and T5, and the bank control circuits 61, 63, 65, and 67 corresponding to the memory banks BANK1, BANK3, BANK5, and BANK7 are supplied with the timing signals T0, T1, T3, and T5. A state signal S is supplied from a 2-bit counter 70 to the bank control circuits 60 to 67 in common. The state signal S is a signal indicating which of the operations shown in FIGS. 16A to 16D is requested by a current all-bank refresh command REFab and is incremented each time the refresh signal AREFab is activated.

The bank control circuits 60 to 67 activate the internal signal CBR or RHR in response to the timing signals T0 to T5. As an example, when the state signal S indicates the operation shown in FIG. 16A, the bank control circuits 60 to 65 activate the internal signal CBR synchronously with the timing signals T0 to T5, respectively, and the bank control circuits 66 and 67 activate the internal signal RHR synchronously with the timing signals T0 and T5. Accordingly, the normal refresh operation is performed in the memory banks BANK0 to BANK5 synchronously with the times t0 to t5 shown in FIG. 16A, respectively, and the row hammer refresh operation is performed in the memory banks BANK6 and BANK7 synchronously with the times t0 and t5. Similarly, when the state signal S indicates the operation shown in FIG. 16B, the bank control circuits 66, 67, and 60 to 63 activate the internal signal CBR synchronously with the timing signals T0 to T5, respectively, and the bank control circuits 64 and 65 activate the internal signal RHR synchronously with the timing signals T0 and T5. Accordingly, the normal refresh operation is performed in the memory banks BANK6, BANK7, and BANK0 to BANK3 synchronously with the times t0 to t5 shown in FIG. 16B, respectively, and the row hammer refresh operation is performed in the memory banks BANK4 and BANK5 synchronously with the times t0 and t5.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. An apparatus comprising:
    a memory cell array including a plurality of word lines each coupled to a plurality of memory cells; and
    a control circuit configured to activate first and second internal signals in a time-division manner in response to a first external command,
    wherein a first number of the plurality of word lines are selected in response to the first internal signal, and
    wherein a second number of the plurality of word lines are selected in response to the second internal signal, the second number is smaller than the first number.

2. The apparatus of claim 1, further comprising:
a first address storing circuit storing an address signal updated in response to the first internal signal;
a second address storing circuit storing an address signal updated in response to an access history of the memory cell array; and
a row logic circuit configured to select the first number of the plurality of word lines corresponding to the address signal supplied from the first address storing circuit in response to the first internal signal, and to select the second number of the plurality of word lines corresponding to the address signal supplied from the second address storing circuit in response to the second internal signal.

3. The apparatus of claim 2,
wherein the memory cell array is divided into a plurality of memory mats,
wherein the row logic circuit is configured to simultaneously select the first number of word lines each belonging to a respective one of the plurality of memory mats in response to the first internal signal, and
wherein the row logic circuit is configured to select one of the word lines belonging to one of the plurality of memory mats in response to the second internal signal.

4. The apparatus of claim 3,
wherein the first number of the plurality of word lines are selected during a first time period,
wherein the second number of the plurality of word lines are selected during a second time period, and
wherein the first and second time periods do not overlap with each other.

5. The apparatus of claim 4, wherein the second number of another word line of the plurality of word lines corresponding to the address signal supplied from the second address storing circuit is selected in response to the first internal signal during the first time period.

6. The apparatus of claim 4, wherein the first number of other word lines of the plurality of word lines corresponding to the address signal supplied from the first address storing circuit are selected in response to the second internal signal during the second time period.

7. The apparatus of claim 1, wherein when a control signal is in a first state, the control circuit is configured to activate the first and second internal signals in a time-division manner in response to a first occurrence of the first external command, and is configured to activate the second internal signal twice without activating the first internal signal in response to a second occurrence of the first external command.

8. The apparatus of claim 1, wherein when a control signal is in a second state, the control circuit is configured to activate the first and second internal signals in a time-division manner in response to a first occurrence of the first external command, and is configured to activate the first internal signal once without activating the second internal signal in response to a second occurrence of the first external command.

9. The apparatus of claim 1, wherein the first external command is a per-bank refresh command.

10. The apparatus of claim 1,
wherein the memory cell array is divided into a plurality of memory banks including first and second memory banks,
wherein the control circuit is configured to activate the first and second internal signals in a time-division manner and to activate third and fourth internal signals in a time-division manner in response to a second external command,
wherein the first number of the plurality of word lines in the first memory bank are selected in response to the first internal signal,
wherein the second number of the plurality of word lines in the first memory bank are selected in response to the second internal signal,
wherein the first number of the plurality of word lines in the second memory bank are selected in response to the third internal signal, and
wherein the second number of the plurality of word lines in the second memory bank are selected in response to the fourth internal signal.

11. The apparatus of claim 10,
wherein the first number of the plurality of word lines in the first memory bank are selected during a first time period,
wherein the second number of the plurality of word lines in the first memory bank are selected during a second time period,
wherein the first number of the plurality of word lines in the second memory bank are selected during a third time period,
wherein the second number of the plurality of word lines in the second memory bank are selected during a fourth time period,
wherein the first and second time periods do not overlap with each other, and
wherein the third and fourth time periods do not overlap with each other.

12. The apparatus of claim 11, wherein the second and third time periods partially overlap with each other.

13. The apparatus of claim 11, wherein the second and fourth time periods are identical with each other.

14. The apparatus of claim 10, wherein the second external command is an all-bank refresh command.

15. An apparatus comprising:
a memory cell array including a plurality of word lines each coupled to a plurality of memory cells; and
a control circuit configured to activate a first internal signal in response to a first external command,
wherein the memory cell array is divided into first and second groups,
wherein a first number of the plurality of word lines in the first group are selected in response to the first internal signal, and
wherein a second number of the plurality of word lines in the second group are selected in response to the first internal signal, the second number is smaller than the first number.

16. The apparatus of claim 15, wherein the first number of the plurality of word lines in the first group and the second number of the plurality of word lines in the second group are simultaneously selected in response to the first internal signal.

17. The apparatus of claim 15,
wherein the control circuit is configured to activate a second internal signal after activating the first internal signal in response to the first external command,
wherein the first number of the plurality of word lines in the second group are selected in response to the second internal signal, and
wherein the second number of the plurality of word lines in the first group are selected in response to the second internal signal.

18. An apparatus comprising:
a memory cell array including a plurality of word lines each coupled to a plurality of memory cells;
a control circuit configured to activate first and second internal signals in a time-division manner in response to a first external command;
a first address storing circuit storing an address signal that is updated in response to the first internal signal;
a second address storing circuit storing an address signal that is updated in response to an access history of the memory cell array; and
a row logic circuit configured to select one or more word lines corresponding to the address signal supplied from the first address storing circuit in response to the first internal signal, and to select one or more word lines corresponding to the address signal supplied from the second address storing circuit in response to the second internal signal.

19. The apparatus of claim 18, wherein when a control signal is in a first state, the control circuit is configured to activate the first and second internal signals in a time-division manner in response to a first occurrence of the first external command, and is configured to activate the second internal signal twice without activating the first internal signal in response to a second occurrence of the first external command.

20. The apparatus of claim 18, wherein when a control signal is in a second state, the control circuit is configured to activate the first and second internal signals in a time-division manner in response to a first occurrence of the first external command, and is configured to activate the first internal signal once without activating the second internal signal in response to a second occurrence of the first external command.

* * * * *